United States Patent

[11] 3,622,861

| [72] | Inventor | Carl Ingvar Boksjo<br>Ludvika, Sweden |
|---|---|---|
| [21] | Appl. No. | 80,565 |
| [22] | Filed | Oct. 14, 1970 |
| [45] | Patented | Nov. 23, 1971 |
| [73] | Assignee | Allmanna Svenska Elektriska Aktiebolaget<br>Vesteras, Sweden |
| [32] | Priority | Nov. 12, 1969 |
| [33] | | Sweden |
| [31] | | 15487/69 |

[54] FREQUENCY CHANGER
5 Claims, 4 Drawing Figs.

[52] U.S. Cl. .................................................... 321/11, 321/27 R
[51] Int. Cl. ..................................................... H02m 1/18
[50] Field of Search ........................................ 321/11, 27

[56] References Cited
UNITED STATES PATENTS
3,530,362  9/1970  Filimonov et al. ............. 321/11

3,536,930  10/1970  Stackegard ................... 307/82
3,280,334  10/1966  Uhlmann et al. .............. 307/83
3,339,083  8/1967  Uhlmann ....................... 321/2 X
3,431,482  3/1969  Uhlmann ....................... 321/27 X
3,448,286  6/1969  Stackegard ................... 321/27

FOREIGN PATENTS
238,823  3/1965  Austria ......................... 321/14

*Primary Examiner*—William M. Shoop, Jr.
*Attorney*—Jennings Bailey, Jr.

ABSTRACT: In combination with two AC networks, there is at least one converter connected to one of the networks which is composed of diodes and at least one other converter composed of controlled rectifiers. A further converter composed of controlled rectifiers is connected to one of the networks. All the converters are connected in series in one or several DC circuits. The further rectifier is controlled by the current in the DC circuit in such a way as to compensate for variations in the direct current therein. It is possible to connect the converters alternatively to either of the AC circuits.

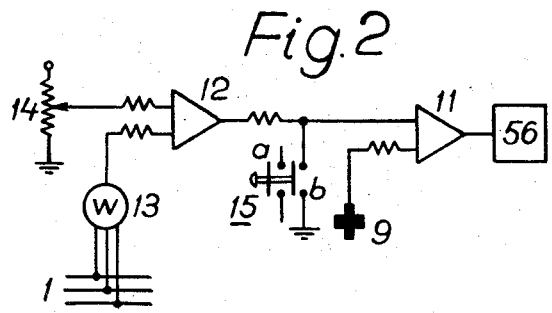
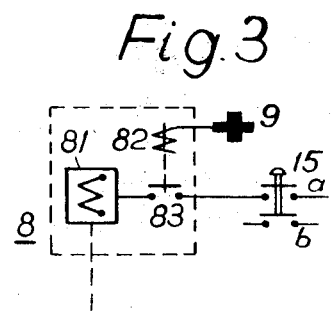
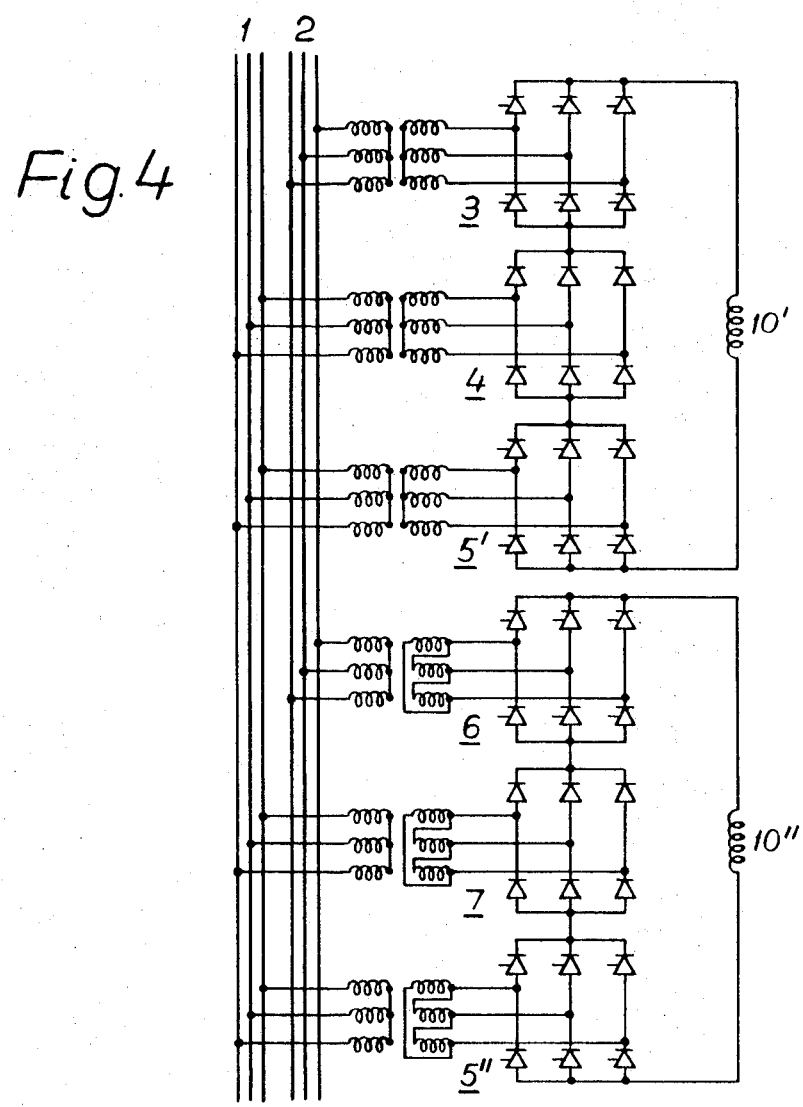

FREQUENCY CHANGER

BACKGROUND OF THE INVENTION

1. Field of the Invention

The present invention relates to a frequency converter for asynchronous connection of two AC networks comprising a number of converters, the DC sides of which are connected in series and the AC sides of which are connected to one or the other of said AC networks.

2. The Prior Art

Frequency converters of this type have previously been constructed using controlled mercury arc rectifiers, but with the arrival of semiconductor rectifiers for high voltages and power it seems natural to replace mercury arc rectifiers by thyristor rectifiers. Another step is to replace the thyristor rectifiers by diode rectifiers in the converters operating as rectifiers so that the control is only in the inverters. The converters must then be connected to the AC network over switches so that upon power reversal the connections can be alternated for rectifier and inverter operation. Such switches must operate rapidly in order to be able to respond rapidly to alterations of the power requirements in the two networks. Such high-speed switches are available nowadays, however.

However, one problem is to protect the diodes in the uncontrolled rectifiers against overcurrents, caused for example by a fault in the AC network connected to the inverters. The inverter control cannot then give sufficient counter voltage on the DC side and there is therefore risk of a current surge since it is not possible to decrease the voltage in the rectifiers.

SUMMARY OF THE INVENTION

In order to rectify this, it is proposed according to the invention to introduce an extra converter having controlled rectifiers and arranged to control the entire range of rectifier-inverter operation. A frequency converter according to the invention thus comprises a group of converters connected to the feeding AC network and designed as diode rectifiers, a second group of converters having controlled rectifiers and operating as inverters on the fed AC network, and an additional converter having controlled rectifiers, as mentioned above.

The inverters preferably operate with constant, maximum delay angle so that their reactive power requirement is limited. The frequency converter is then controlled solely with the help of the extra converter which must therefore be sufficiently large with respect to the other converters. The extra converter may have the pulse number 12 in order to limit the number of harmonics. As will be seen in the following description, it is in principle immaterial which AC network the extra converter is connected to, but in practice it is probably most convenient to connect it to the feeding network.

BRIEF DESCRIPTION OF THE DRAWINGS

The invention will be further described with reference to the accompanying drawings in which:

FIG. 2 shows the control circuit for the extra controlled converter.

FIG. 3 shows a device for pole switching of the frequency converter during power reversal between the AC networks.

FIG. 4 shows a modification of FIG. 1.

DESCRIPTION OF THE PREFERRED EMBODIMENTS

Figure 1:
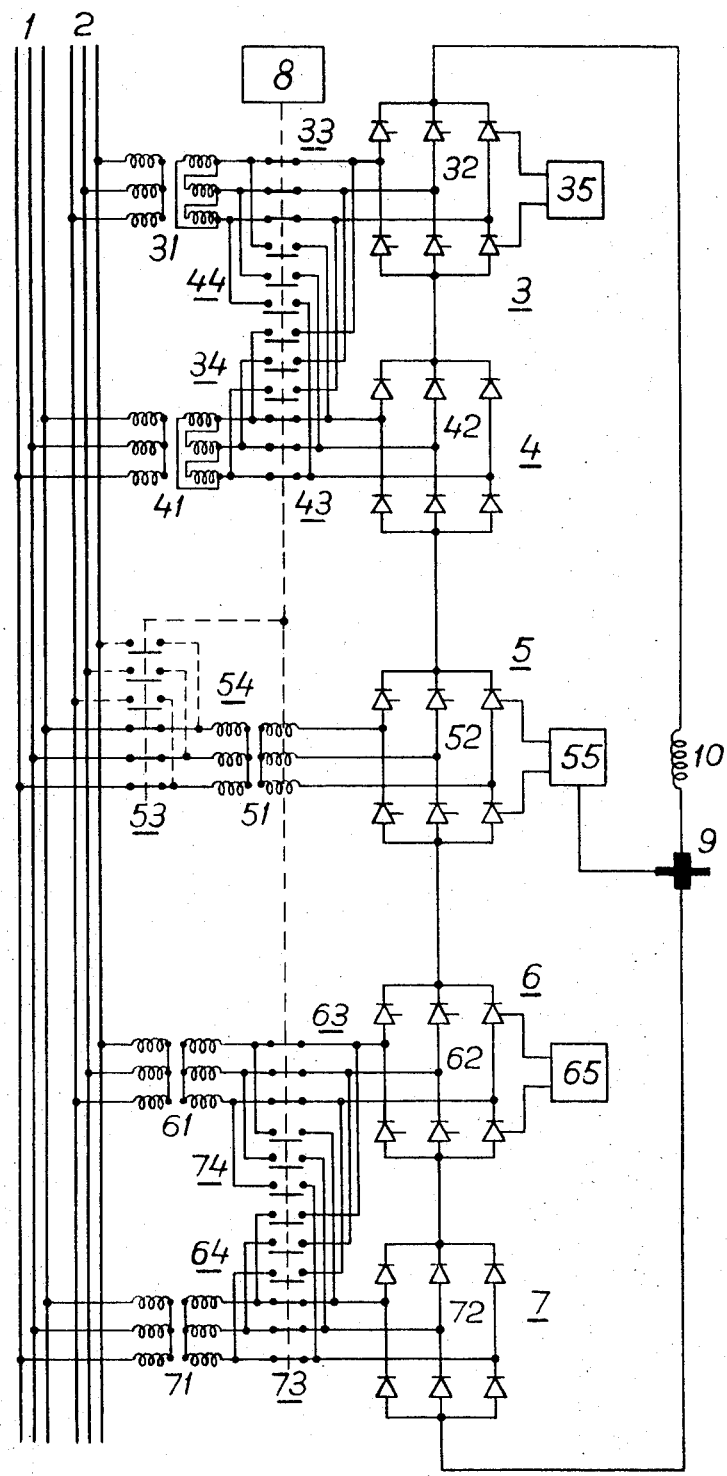
FIG. 1 shows a frequency converter according to the invention.

FIG. 1 shows two AC networks 1 and 2 which are connected over a frequency converter comprising five converters 3–7, the DC sides of which are connected in series over a smoothing reactor 10. Each converter comprises a converter transformer 31, 41, etc. and a rectifier bridge 32, 42, etc. These are connected together over connecting members 33, 43, etc. but extra connecting members 34, 44, etc. are arranged in parallel with them for switching over the converter, as will be described later. The converters are shown as six-pulse rectifier bridges with one rectifier in each bridge. However, in reality each branch has a large number of rectifiers connected in series and in parallel, corresponding to the desired voltage and current.

The converters 4 and 7 connected to network 1 are constructed with diodes and thus intended as rectifiers. The converters 3, 5 an 6, on the other hand, are provided with controlled rectifiers, for example thyristor rectifiers and control members 35, 55, 65 for these controlled rectifiers. The converters 3 and 6 connected to network 2 are therefore intended to operate as inverters. Converter 5 is the extra converter according to the invention and is intended to be controlled over the entire range of rectifier-inverter operation.

The current in the DC circuit is determined by the expression $$(2 \cdot E_L + 2 \cdot E_V + E_s)/R$$

where $E_L$ is the direct voltage in the rectifiers 4 and 7 and $E_V$ is the direct voltage in the inverters 3 and 6, which is negative in relation to $E_L$, and $E_s$ is the direct voltage in the controlling converter 5. $R$ is the resistance in the DC circuit. $E_L$ is therefore solely dependent on and proportional to the voltage in the network 1, whereas $E_V$, which is proportional to the voltage in the network 2, may also be affected by the control from the control pulse device 35 and 65. However, in order to limit the reactive power in the network 2, it is suitable to control the inverters 3 and 6 with a constant, minimum commutation margin so that the control devices acquire the character of commutation margin control devices, for example in accordance with U.S. Pat. No. 2,774,012 or patent application Ser. No. 822,555, Ake Ekstrom, filed May 7, 1968.

In order to be able to switch over the converters by means of the switches 33, 34, 43, 44 etc. as will be explained later, the converter transformers 31, 41, 61, 71 must be designed with such a conversion ratio that the voltage on their rectifier windings is the same. For a converter the direct voltage must also be equal to $E \cdot \cos \beta$, where $\beta$ is the delay angle and $E$ is the maximum or ideal no-load voltage which is determined by the voltage in the rectifier winding of the converter transformer. $E$ will therefore be the same for the converters 3, 4, 6 and 7. For the diode rectifiers 4 and 7, $\beta$ is zero and in the inverters 3 and 6, $\alpha$ might be 150° as a low value. In this case the direct current will be $$I = (2 \cdot E - 2 \cdot E \cdot 0.87 + E_s)/R$$

From this it is possible to calculate how large the rated voltage of the converter 5 must be, since the direct current $I$ must be able to vary between a maximum value $I$ max. and zero. The direct voltage $E_s = E' \cos \alpha$, where $E'$ a measurement of the rated voltage in the rectifier winding of the transformer 51.

Maximum direct current $I$ max. corresponds to full rectifier operation of the converter 5 whereas direct current zero corresponds to full inverter operation of this converter. The corresponding delay angles $\alpha$ may be set as 5° and 150°. If these values are inserted in the above equation, $E'$ will be equal to $R \cdot I$ max. $-0.26 \cdot E$ and $0.3 \cdot E$, respectively, which means that $E'$ will be equal to or greater than the largest of these values. A suitable choice of $E$ and $I$ max in relation to each other exists if these two expressions are substantially equal, and it can be seen from the expression $E' = 0.3 \cdot E$ that the converter 5 should have a rated voltage which is only about one-third of the rated voltage of the other converters.

The above example should only be considered as a numerical example in order to show that the converter 5 may be considerably smaller than the other converters. It should also be mentioned that the delay angle 150° is rather low for inverter operation. With larger delay angles, for example about 165°, which is more realistic, $E'$ will be even smaller.

The control system 55 of the converter 5 is shown in more detail in FIG. 2 and comprises a control pulse generator 56 which emits control pulses having a certain delay angle to the rectifiers in the bridge 52 in FIG. 1. This delay angle is determined by the control amplifier 11, to the input side of which is connected the actual value of the direct current, which is measured by the measuring transducer 9, and also a desired value which is obtained from a second control amplifier 12. The actual value and desired value are connected to the control amplifier 12 to provide an operational magnitude, for example a signal proportional to the transmitted power of the frequency converter. The actual value of this power can be measured by a watt meter 13 connected to one of the networks 1 or 2 at the input to the frequency converter or by adding the direct voltages over the converters connected to one network and multiplying this sum by the direct current. The desired value is set on the potentiometer 14.

The difference between the signals from 13 and 14 corresponding to the actual and desired transmitted power results in an output signal from 12 which forms the desired value for the direct current. A signal is thus obtained from 11 which sets the delay angle of the control pulse generator 56 so that the value measured by the transductor 9 corresponds to the signal from 12.

It is clear from the above that it is immaterial which of the networks 1 or 2 the converter 5 is connected to for control of the converter 5 and thus the frequency converter as a whole. However, since the converter 5 may be controlled with greatly varying delay angle, it may give rise to or require considerable reactive power and it may therefore be advisable for it to be connected to the feeding AC network. It may also be advisable for this converter to be provided with a switch 53,54 which is controlled together with the switches for the other converters, in order to cover the possibility of power reversal.

The most important reason for the controlling converter to be connected to the feeding AC network is its current-limiting function in the case of a fault in the fed AC network. In this case $E_s$ should as far as possible counter the decrease of the term $2 \cdot E_v$ in the previous expression for direct current. The is best achieved if the converter 5 is connected to a network having full voltage. In this case also there is a circumstance affecting the choice of the magnitude of the converter 5. If one does not wish to choose 5 so large that it can compensate for a total loss of voltage on the fed AC network, the arrangement should be provided with some form of overcurrent protection means, for example in accordance with patent application Ser. No. 675,824, Boksjo, filed Oct. 17, 1967.

From FIG. 1 it is clear how half the converters are phase displaced in relation to the other half by means of Y and D connection, respectively, of the rectifier windings of the transformers. The number and power of the harmonics from the converters is thus limited by the 12 pulse connection thus obtained. For the same reason, the converter 5 may have two six-pulse bridges phase displaced in relation to each other so that 5 also operates in 12 pulse operation. This is automatically fulfilled by a connection according to FIG. 4.

As mentioned previously, power reversal can only effected by switching the converters since the diode converters can only operate as rectifiers. Such switching is carried out by means of the switching contacts 33, 34, etc., in FIG. 1 when the direct current has been reduced to zero. In FIG. 1 these switches are connected between the converter transformers and the rectifier bridges. The transformers may then be designed for the proper network frequency and the switches will be currentless when the direct current is zero. If the switches are arranged on the network side of the converter transformers, as is the case for the converter 5, they will always carry at least the excitation current of the transformers. On the other hand, in this position, their function can be fulfilled by AC circuit breakers, not shown. For the converter 5, the provision of switches between the transformer and the rectifiers would involve duplication of the transformers. For all converters it is possible to place switches between the network and the transformer only if the nominal voltages of the networks are equal or substantially equal.

The switches are controlled by means of a control device 8, the construction and function of which are in principle clear from FIG. 3.

The control device consists of a so-called bistable relay 81, that is, a relay which, upon an impulse, flips over from one position to the other. The relay 81 is controlled by two contacts, the contact 83 on a relay 82 controlled from the measuring transducer 9 and a contact 15a, which may possibly be operated manually.

The power direction is reversed simply by pressing in the contact 15 which is seen both in FIG 2 and in FIG. 3. The contacts 15a and b thus close, the latter cancelling the output signal from the amplifier 12 in FIG. 2, so that the control amplifier 11 reduces the current in the converter 5 until the direct current of the converter is zero. The relay 82 then drops and the relay 81 is activated over the contacts 83 and 15a, the contacts 33, 34, 43, 44, etc., in FIG. 1 thus being switched. As before, switching of the converter 5 is not absolutely necessary, but depends on how reliable the network 1 is. The connections to 54 may therefore in some cases be omitted.

FIG. 4 shows a modification of FIG. 1 in which the converter 5 is divided into two parts 5' and 5'', whereas in other respects it corresponds to that in FIG. 1. For this reason such details as the switches and the control system have been omitted. It is seen from the previous equations that the rated voltage for each of these converters 5' and 5'' need only be half that of the converter 5. By means of this division the converters connected to one network always have the pulse number 12, whereas the converter 5 according to FIG. 1 had the pulse number 6.

For the sake of simplicity the switches have been omitted in FIG. 4, but it is obvious that for power reversal there must be carried out by switches in accordance with FIG. 1. Furthermore, in FIG. 4 the converters have been distributed over two separate DC circuits, each with its own reactor 10' and 10'', respectively, which may be an advantage if it is desired to disconnect half the converters during half power.

I claim:

1. In combination with first and second AC networks, at least a first converter connected to the first AC network and comprising diode rectifiers, at least a second converter connected to the second AC network comprising controlled rectifiers and operating as inverters, control means for said controlled rectifiers, at least a third converter connected to one of the AC networks and comprising controlled rectifiers, said converters being connected in series in at least one DC circuit, and means responsive to differences between a desired magnitude and an actual magnitude in the DC circuit to control said third converter to compensate for variations in the direct current.

2. In a combination as claimed in claim 1, said control means for the third converter including means to keep the delay angle of the controlled rectifiers thereof substantially smaller than the delay angle of the controlled rectifiers of the second converter.

3. In a combination as claimed in claim 1, means for alternatively connecting the first converter to the second AC network and the second converter to the first AC network.

4. A combination as claimed in claim 3, in which said connecting means include transformers, and switches between the transformers and the rectifiers.

5. A combination as claimed in claim 1, in which the third converter is connected to the first AC network.

* * * * *